Patented May 7, 1940

2,199,522

UNITED STATES PATENT OFFICE 2,199,522

SUGAR SIRUP

Martha R. Jones, San Francisco, Calif.

No Drawing. Application September 3, 1937,
Serial No. 162,388

9 Claims. (Cl. 99—142)

This invention relates to sugar sirups and it comprises, as a new material, a sugar sirup composed of sugar cane juice and containing certain constituents of citrus fruit juices, and it further comprises processes of preparing such sirups wherein a sugar cane sirup is combined with citrus fruit juices which have been treated to decrease the acidity thereof.

Hitherto sugar sirups, and by that is meant sugar solutions which have been concentrated to a sirupy condition, have not generally been combined with fruit juices except for the purpose of imparting the flavor of the juice to the sirup. For example, it is not new to prepare mixtures containing sugar and the juice of various citrus fruits. In most instances, these products are made by simply admixing the fruit juice with the sirup. Moreover, the sugar sirups previously used in such mixtures have usually been prepared from cane sugar. My invention, however, contemplates the use of a sugar sirup prepared from sugar cane juice.

I have discovered that sugar cane juice because of its natural properties, not present in sirups prepared from cane sugar, is extremely beneficial to health and teeth, particularly of infants. In addition to being rich in sugar, sugar cane juice is also rich in minerals. Its ash contains a predominance of alkaline elements, the more important of which are sodium, potassium, calcium, magnesium and iron. It may or may not contain vitamins or a trace of copper. The importance of an excess of alkaline elements over the acid in the diet, and the relation of one element to another, as copper to iron, are just beginning to be appreciated by students of nutrition.

Cane juice has been concentrated into a sirup in open kettles from the earliest of times. That it lost much of its mineral matter through precipitation has always been regarded as unimportant. In common practice, the precipitate containing valuable nutrients is discarded. While methods of inverting sucrose in the cane juice by the use of invertase and acids of various kinds to prevent crystallization are well known, no one has hitherto devised a method of keeping in solution in a concentrated sirup all the sugar, minerals and vitamins of the original cane juice and of adding thereto other minerals and vitamins which may be present in amounts less than those desired.

By the present invention, however, a method is provided for producing a concentrated sirup containing the sugar, minerals and vitamins of the original cane juice and other nutrients which are desirable from a nutritional standpoint. The more important nutrients, which are principally furnished by the cane juice and in part by citrus fruit juices, are vitamins A, B and C and sodium, potassium, calcium, magnesium, phosphorus, iron and copper. Deficiencies in iron and copper are made good by preparing the sirup in iron and copper vessels or exposing iron and copper to the action of the natural juices.

It is well known that citrus fruit juices in general contain vitamins important in the normal diet of infants and children, and more especially necessary in diets designed to correct conditions resulting from vitamin deficiency. Among such juices are those derived from oranges, lemons and limes. The addition of citrus fruit juices to milk formulas prescribed for infants would, therefore, be highly desirable but this has not been possible of satisfactory accomplishment because the acid in the juice curdles the milk and the resulting mixture sometimes causes the infant to regurgitate. In citrus fruit juices having a high acid reaction, such as lemon and lime juices, these effects are pronounced. It is also desirable that the citrus fruit juice be incorporated in a sugar sirup and the resulting mixture then used as a milk supplement in babies' formulas but no one has hitherto been able to satisfactorily solve the problem of incorporating citrus fruit juices, especially lemon and lime juices in feeding formulas of this type.

By my invention, ways are provided by which the valuable vitamins and mineral constituents of raw citrus fruit juices can be used in feeding formulas without meeting the difficulties previously considered unavoidable. I have been able to prepare a sugar sirup more especially useful as a milk supplement containing sugar, as well as all the other nutrients of sugar cane juice, and the active principles of citrus fruit juices and which can be added to milk in feeding formulas with no difficulty at all and the resulting product tolerated by the infant. The sirup has a high vitamin content and a degree of acidity which will insure that the minerals are held in solution, that the sucrose does not crystallize, that the flavor is pleasing and that the milk to which it is added in the preparation of formulas for infants does not curdle.

In the practice of the present invention, I first neutralize a part or all of the organic acids in the citrus fruit juice. The larger quantity of these acids is citric acid, although others may also be present. Following neutralization of the juice, I then clarify it. These process steps give me a juice which contains the normal content of vitamins and minerals substantially unchanged. I next prepare a sugar sirup from sugar cane juice to which has been added untreated citrus fruit juice and then finally combine the sugar sirup with the substantially neutralized and clarified juice described above.

In order that my invention may be more clearly understood, I shall now describe one specific way of preparing the sugar sirup of the present invention. In this specific example, I refer to lemon juice but it is to be understood that lime or other citrus fruit juices can also be used. Lemon and lime juice are both materials containing relatively high quantities of organic acids. They also contain extremely valuable vitamin and mineral constituents.

I first provide 20 gallons of raw sugar cane juice from freshly cut unburned cane, 2 quarts of lemon juice, 2¼ pounds of kieselguhr, 1 pound of a suitable decolorizing carbon, 5 ounces of calcium hydroxide and 1 ounce of sodium bicarbonate.

I next mix the calcium hydroxide and sodium bicarbonate thoroughly, both of which constituents are powdered, and make them up into a suspension in water. The lemon juice is strained and about three-quarters of the strained juice is heated to boiling. The mixture of calcium hydroxide and sodium bicarbonate is then added to the hot solution of juice to bring the pH thereof to about 4.7. Obviously the actual amount of alkaline agent used will vary with the acidity of the juice and the quantity of calcium hydroxide and sodium bicarbonate stated merely indicates rough approximations of what is ordinarily necessary. The alkaline material precipitates the citric acid in the juice as an insoluble salt thereof. Then I add about 3 or 4 ounces of kieselguhr to the juice and filter the mixture. The amount of kieselguhr used should be enough to insure a water clear filtrate. Other clarifying agents commonly used in the arts can of course be substituted. After filtration I obtain a water clear filtrate containing substantially all of the vitamin C content of the original juice, and most of the minerals, but which juice has a greatly reduced acidity. This juice is then to be added to a semi-sirup which I shall now describe.

In the preparation of the semi-sirup the 20 gallons of raw sugar cane juice are mixed with the rest of the lemon juice filtrate obtained in the step of straining the raw lemon juice. The lemon pulp strained out is also added to the sugar juice. Two pounds of kieselguhr and one pound of a suitable decolorizing carbon are added to the sirup and the whole mixture brought to a boil slowly, and boiled for about ten minutes. Then the mixture is filtered and the clarified sugar sirup concentrated to a semi-sirup stage at a temperature of about 218° F. During this process the citric acid in the lemon juice inverts a substantial part of the sucrose in the raw sugar cane juice. This is desirable because invert sugar prevents the sirup from crystallizing. Finally, the semi-sirup thus obtained is mixed with the clarified and treated lemon juice from which most of the organic acids have been removed and the combined solutions transferred to a vacuum pan where they are concentrated under a vacuum to the final desired concentration. This is usually about 75 Brix. The vacuum is generally about 26 inches.

In the practice of my invention, the lemon juice serves in part to hold the minerals of the cane juice in solution and to invert most of the sugar thereof and in part to add vitamins and minerals to the sugar sirup. Moreover, these results are accomplished under conditions which avoid prolonged heating operations which might result in loss of vitamins.

Although I have stated certain specific quantities of ingredients in the above description, it is of course to be understood that these can be varied over quite wide limitations. The actual quantity of kieselguhr and decolorizing agents to be used are dependent upon the activity of the agent and the character of the juice treated therewith. These agents not only give water clear filtrates, but they also remove undesirable molasses flavors.

In the foregoing example, I have referred more especially to the use of calcium hydroxide and sodium bicarbonate as an alkaline agent to neutralize the citric acid in the lemon juice. I have found that the mixture of alkalis in the proportions stated gives a more pleasing taste than when but one of these substances is used. However, I need not necessarily use a mixture of these alkaline substances and I can use lime alone if necessary.

I find it advantageous to conduct the boiling of the raw sugar cane juice to the semi-sirup stage in an open kettle since under these conditions any "earthy" flavor and odor, sometimes found in the raw cane juice, is driven out. If the cane juice is deficient in copper, the presence of which is necessary for the human body to utilize iron, copper may be supplied by cooking the juice in a copper kettle or by exposing copper to the action of the cane or citrus juices. Deficiencies in iron may be corrected in similar ways. The final concentration of the semi-sirup, after admixture with deacidified lemon or other citrus fruit juice, is best conducted in a closed vacuum pan.

Although superior results are obtained by following the detailed process steps given above, my invention is susceptible to several modifications. For example I need not always add raw citrus fruit juice to the sugar juice, but the addition of such juice is desirable as the acid content thereof prevents precipitation of the minerals of the cane juice when the cane juice is concentrated as well as increases the solubility of the minerals and thus enables them to be more readily digested by an infant.

Or I can reduce the extent of deacidification of the juice so that the juice still contains some citric acid and add this partially neutralized juice to the semi-sirup and concentrate under vacuum. This gives me a final product containing some invert sugar, as well as sucrose, and the vitamins and minerals of the cane and citrus juices.

Generally, however, I prefer to add normal citrus fruit juice and deacidified citrus fruit juice since this results in sugar inversion, a more acceptable flavor, a higher vitamin content, and a product having excellent nutritive value which is particularly suitable as a milk supplement in feeding formulas.

This application is a continuation in part of my copending application Serial No. 63,453, filed February 11, 1936.

What I claim is:

1. A sirup useful as a milk supplement, said sirup comprising concentrated sugar cane juice and citrus fruit juice containing substantially all the minerals and vitamins present in said juices in their natural state, and a partially neutralized citrus fruit juice having an acid content insufficient to curdle milk.

2. A sirup useful as a milk supplement, said sirup comprising concentrated sugar cane juice containing substantially all the minerals present in the juice in its natural state, and partially neutralized lemon juice, the acidity of said sirup being sufficient to prevent the precipitation of said minerals and insufficient to curdle milk.

3. A sirup useful as a milk supplement, said sirup comprising concentrated sugar cane juice containing substantially all the minerals present in the juice in its natural state, sucrose, invert sugar, and a partially neutralized citrus fruit juice having an acidity sufficient to prevent the precipitation of said minerals and insufficient to curdle milk.

4. A sirup useful as a milk supplement, said sirup comprising concentrated sugar cane juice containing substantially all the mineral content of said juice in its natural state, a citrus fruit juice in its natural state, and a partially neutralized fruit juice having an acidity sufficient to prevent the precipitation of said minerals, the volume of said partially neutralized juice substantially exceeding that of said natural fruit juice, and said sirup having an acidity insufficient to curdle milk.

5. A sirup useful as a milk supplement, said sirup comprising sugar cane juice and lemon juice containing substantially all the minerals and vitamins present in said juices in their natural state, and lemon juice having a citric acid content substantially lower than that of normal lemon juice, and said sirup having an acidity sufficient to prevent the precipitation of said minerals and insufficient to curdle milk.

6. A sirup useful as a milk supplement, said sirup containing concentrated sugar cane juice containing substantially all the minerals present in the juice in its natural state, sucrose, invert sugar, and a citrus fruit juice having an acid content insufficient to curdle milk.

7. The process of preparing a sugar sirup which comprises mixing sugar cane juice with raw citrus fruit juice, partially concentrating the mixture, adding to said mixture a partially neutralized citrus fruit juice, and finally concentrating the resulting mixture to the desired sirupy consistency.

8. The process of preparing a sugar sirup which comprises mixing sugar cane juice with raw citrus fruit juice, clarifying and partially concentrating the mixture, adding thereto a quantity of clarified and partially neutralized fruit juice for decreasing the acidity of the mixture to a point insufficient to curdle milk and yet adequate to prevent precipitation of most of the minerals originally present in the cane juice, and finally concentrating the resulting mixture to the desired sirupy consistency.

9. The process of preparing a sugar sirup which comprises mixing sugar cane juice with raw citrus fruit juice, partially concentrating the mixture, adding to said mixture a partially neutralized citrus fruit juice. and finally concentrating the resulting mixture to the desired sirupy consistency.

MARTHA R. JONES.